May 9, 1939.  G. A. TINNERMAN  2,157,641

DOOR DOVETAIL CONSTRUCTION

Filed May 20, 1937

Inventor
GEORGE A. TINNERMAN
H. G. Lombard
Attorney

Patented May 9, 1939

2,157,641

UNITED STATES PATENT OFFICE 2,157,641

DOOR DOVETAIL CONSTRUCTION

George A. Tinnerman, Rocky River, Ohio, assignor to Albert H. Tinnerman, Cleveland, Ohio Application May 20, 1937, Serial No. 143,786

11 Claims. (Cl. 189—36)

This invention relates to door dovetails and like constructions generally wherein the complemental dovetail members are mounted on the door and door frame, respectively, to cooperate in preventing vibration and to maintain the door in proper relation to the door frame when closed.

More particularly, this invention deals with the mountings for cooperating elements, such as co-engaging dovetail members, wherein it is necessary or desirable that one or both of such members be adjustable in its mounting to facilitate proper engagement thereof at the time of installation or to take up for wear after a period of use.

In connection with automobile bodies, for example, it is the common practice to provide the doors thereof with one or more anti-vibration devices. Such anti-vibration devices usually comprise complementary lug and socket members having a substantial wedge or dovetail engagement in cooperating position, the lug being mounted on the door and the socket being fastened to a post or jamb of the door framing, or vice versa. Heretofore, it has involved a tedious, laborious and time-consuming operation to properly position the lug with respect to the socket at the time of installation or to take up for wear after a period of use. Most often, when the cooperating members are not in proper engagement after being mounted on their respective supports, it has been a matter of difficulty and expense to drill or otherwise provide for any discrepancy such that the cooperating members may engage properly. Automobile bodies usually have a molding, stripe or belt line which extends around the body to embellish the same and, of course extends in part, across the doors. Naturally that portion of the molding, stripe or belt line on the doors must be in alignment with the portions thereof on the body. Usually, after a period of use, the doors will sag and hang improperly from their mountings and unless this sag is compensated for by the dovetail when the door is closed, the door eventually becomes distorted and warped such that the molding, stripe or belt line is discontinuous, unsightly and mars the appearance of the automobile body. To obtain complete alignment of the molding or stripe, and also to prevent vibration of the door in the door frame are sources of considerable trouble and expensive delay on an assembly line, especially in the assembly of all metal structures, where it is inconvenient and laborious to compensate for an improperly drilled hole or to provide a new accurately positioned hole to suitably receive the shank of a fastening means such that the dovetail members are accurately positioned for proper engagement.

It is therefore an object of this invention to provide a mounting for a dovetail or the like member on a wall support, which mounting includes means for receiving bolt or screw fastening elements in the necessary location thereof for properly mounting the member, and which also embodies in its structure provision for ready adjustment of the member relative to the support for correct alignment with its cooperating member at the time of installation or at any time thereafter to compensate for wear.

Another object of the invention aims to provide an adjustable mounting for a door dovetail member, or the like, which is reliable and effective in use, easily and quickly installed, and which is simple and light-weight in construction to be most inexpensive in cost of manufacture, shipping and handling.

A further object of the invention comprehends the provision, in a dovetail or like device, of improved means for rigidly and adjustably supporting a member in a mounting comprising a minimum of parts and including a relatively thin, light-weight, plate-like retaining device provided with integral means for receiving bolt fastenings or the like, thereby dispensing with the use of conventional nuts and complicated expensive nut holding devices.

A still further object contemplates the provision of a mounting for a dovetail member, or the like, comprising a retaining device having means cooperable with means provided on a support to simplify the assembly of the mounting thereon and to permit quick, easy adjustment of the mounting in the assembled relation thereof on the support.

A more specific object is for the provision of a mounting for a dovetail member, or the like, comprising a relatively thin, plate-like retaining device having integral means cooperating with means provided on a support to simplify the assembly thereof, and other integral means deformed therefrom adapted to receive bolt fastenings or the like to provide a mounting substantially equal in strength and durability to constructions embodying complicated and expensive nut and nut holding devices, heretofore employed.

Other objects and advantages of the improved structure will be apparent to those skilled in the art as a description thereof proceeds with reference to the accompanying drawing in which like reference characters designate like parts throughout the same, and in which:

Fig. 3 is a fragmentary, perspective view of the inner face of the door frame section shown in Fig. 1, illustrating a form of keeper means provided thereon for cooperating with the retaining device to facilitate the assembly and mounting of a dovetail member, or the like;

In the mounting of cooperating members such as the lug and socket members of a door dovetail construction, some means must be provided for adjusting one or both of such members such that they may be suitably positioned to properly engage, or it often becomes necessary to provide a new, accurately positioned hole to receive the bolt fastening means. In the assembly of all metal structures such as the doors of present day automobile bodies, it is most inconvenient, laborious and time-consuming to compensate for an improperly positioned hole by drilling a new hole. To overcome this, it has been found expedient to make the holes in the support of extra large size such that the bolt or other fastening means are freely movable therein whereupon the dovetail member may be adjusted and clamped on the support as necessary to properly engage with its cooperating member. However, because the nuts with which the bolts coengage are located interiorly of the door frame and therefore are not easily accessible for threading onto the bolts, and also due to the fact that the nuts must have free movement to correspond with the applied position of the bolts, it has heretofore been necessary to mount the nuts by a form of nut-holding means such as cage devices which are spot-welded or riveted onto the inner face of the wall support and in which the nuts are adapted for free movement to coengage with the bolts at any point depending on the necessary location of the bolts to suitably clamp the dovetail member.

The use of such cage devices for thus positioning nut elements in inaccessible locations is objectionable due to the excessive costs involved and also the expensive, time-consuming operation required in spot-welding, or riveting the assembled nut and cage onto the supporting member. The instant invention therefore contemplates an adjustable mounting for a door dovetail member, or the like, in which the use of conventional nuts and separate nut-holding devices therefor is entirely dispensed with; likewise, the expensive, time-consuming operation of spot-welding or riveting the nut-holding devices onto the door frame is eliminated with the resultant savings in costs of manufacture. At the same time, an adjustable mounting is provided in which the assembly of the several parts thereof is simplified, and which is equal in strength and appearance to heretofore known means for providing an adjustable mounting for a member.

Figure 1:
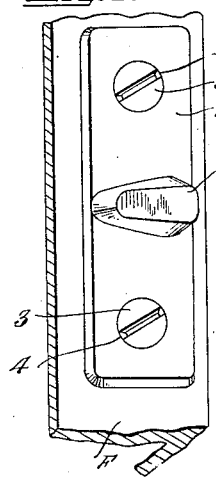
Fig. 1 is a fragmentary, perspective view illustrating the wedge member of a door dovetail mounted on the outer face of a door frame section.
Figure 2:
Fig. 2 is a perspective view of a retaining element for mounting a dovetail member embodying the present invention.
Figure 6:
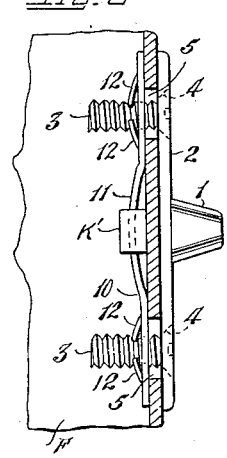
Fig. 6 is a side elevational view of a complete assembly showing the adjustable mounting provided for the door dovetail wedge member on the door frame section.
Figure 7:
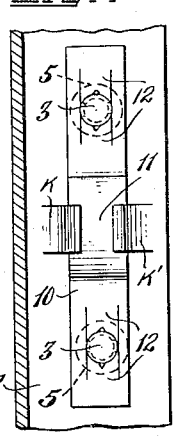
Fig. 7 is a plan of Fig. 6.

Referring to the drawing, Fig. 1 shows the lug member of a door dovetail comprising a wedge element 1 carried by a base plate 2, which is mounted on the outer face of a door frame section F, by bolt fastening means 3 passing through apertures 4, 5, in the plate and frame sections, respectively, to cooperate with a retaining element 10 disposed on the inner face of the door frame section as shown in Figs. 6 and 7. Preferably, the retaining element is constructed from sheet metal, spring steel, cold rolled metal, or any other similar, substantially flat stock having a thickness relatively thin with respect to the cross section of the bolt fastening means with which it cooperates. As shown in Fig. 2, the retaining element 10 may be in the form of an elongated blank which is suitably deformed to provide a substantial hump portion 11 for a purpose hereinafter set forth. Deformed, struck, extruded or otherwise provided on the retaining element are bolt receiving means 12 adapted to coengage with the threads of the bolts 3, substantially in the manner of nuts. The bolt receiving means thus provided may be of suitable form and construction depending on the strength required and the use to which the retaining element is put, so long as the elements thereof threadedly engage with the bolts as they are driven home. As shown, a form of the bolt receiving means may comprise oppositely facing spring tongues 12, struck from the body portion of the retaining device and suitably notched at their extremities to snugly engage the grooves intermediate the threads of the bolts. In this relation, the spring tongues serve not only as nut devices, but also, are effective as bolt locking means in that, when the bolts are driven home, they become tensioned to dig into the threads and root diameters of the bolts and thereby prevent loosening or reverse rotation thereof from applied position. The bolt receiving means 12 on the retaining element are spaced a distance substantially equal to the spacing of the apertures 4 in the base plate 2 of the dovetail member to be in substantial alignment in the assembly thereof with the bolts 3, as illustrated in Fig. 6.

Figure 3:
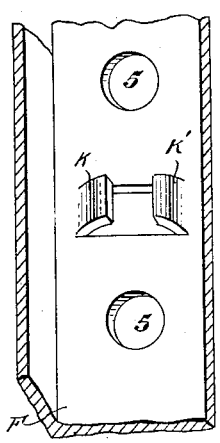
Figure 4:
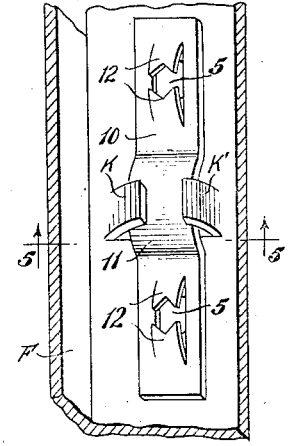
Fig. 4 is a fragmentary, perspective view showing the retaining device in assembled relation with the keeper means provided on the door frame section.
Figure 5:
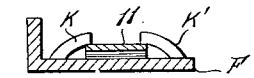
Fig. 5 is a section taken on line 5—5 of Fig. 4, showing the elements of the keeper means in end elevation and their cooperative engagement in assembled relation with the retaining device.

As shown in Figs. 3 and 4, a form of keeper means is provided on the door frame wall section F and is adapted to seat and hold the retaining element thereon in suitable position preparatory to the application of the bolts to mount the dovetail member by its base plate 2. The keeper may embody any suitable means provided on the door frame, but preferably comprises integral elements K, K', struck from the door frame wall section and deformed to provide a substantial bight or socket adapted to support the retaining element in assembled relation on the inner face thereof as shown in Fig. 4. Also provided in the wall section are openings 5 through which the bolt fastenings may pass to engage the bolt receiving means 12, and connect the base plate 2, to the retaining element. The centers of the openings 5 in the frame are substantially equally spaced to those of the apertures 4 in the base plate, but are materially greater in diameter as shown in Fig. 6, such that the bolt fastenings 3 have a substantially uniform clearance therein in order that the complete mounting be capable of adjustment in its assembled relation on the support, whereby the dovetail member may be positioned as necessary to properly engage with its cooperating member at the time of installation or to compensate for wear anytime thereafter without disassembling any of the parts of the mounting.

From the foregoing, it will appear that a door dovetail member, or the like, may be adjustably mounted on a wall support in a relatively simple assembly embodying substantially the several elements above described in detail. Thus, as shown in Fig. 3, the door frame wall section need be only provided with simple inexpensive keeper means in the form of integral elements K, K', deformed therefrom and which may be obtained in the same punching operation with little or no added cost over that involved in providing the necessary bolt passages 5. The retaining device 10 may then be readily applied to assembled relation on the support to be held in position by the frictional engagement of the hump portion 11 thereof with the keeper elements K, K' substantially as shown in Fig. 4. Since the keeper elements K, K' have a space between them, the retaining device may be most easily applied by canting the same to present an edge portion thereof into engagement with one keeper element whereupon it may be moved laterally such that an opposite edge portion may clear the other keeper element and thus be seated therebetween; then, upon movement of the retaining device longitudinally, the hump portion 11 thereof is necessarily caused to frictionally engage the keeper elements such that the retaining device is held in desired, operative position with the bolt engaging means 12 overlying the bolt passages 5 provided in the wall support. See Fig. 4. The application of the retaining device on the support in this manner is quickly accomplished and provides a most rigid assembly which is not subject to accidental displacement in shipping or handling. This is most important in mass production in that the retaining devices may be readily applied on the support in a quick, simple operation by one worker, whereupon another worker need only apply the bolts 3 to the bolt receiving means 12 to secure the base plate 2 and thereby suitably mount the door dovetail member 1, Fig. 6, for proper engagement with its cooperating member. Since the bolt passages 5 in the frame are considerably larger than the diameter of the bolt fastenings 3, the bolts are freely movable therein such that the completed assembly is adjustable as a unit on the frame. When a dovetail member is properly located, the assembly is rigidly clamped in desired mounted position on the wall support by driving the bolts fully home; in this relation, the bolts are effective to tension the tongues of the bolt receiving means 12, to cause the same to cut deeply into the grooves intermediate the threads of the bolts 5 and thereby lock the same in applied position against reverse rotation or accidental loosening due to vibration and jarring effects incident to use of the automobile. This locking action of the spring tongues naturally eliminates the necessity for lock washers yet, at the same time, permits the bolts to be driven fully home without stripping the threads or otherwise affecting the efficiency thereof in rigidly clamping the dovetail member in desired position to be equal in strength and appearance to any heretofore known type of mounting.

It is apparent that with this construction the lug and socket members of a door dovetail, or the like, may be readily mounted and easily and quickly positioned on their respective supports for proper engagement with each other in cooperative relation; after the initial installation either or both members may be easily adjusted on its support simply by loosening the associated bolt fastenings whereby the assembly is movable as a unit and may be clamped in a new location on the support to take up for wear and prevent vibration or sag in the door when in its fully closed position.

Figure 8:
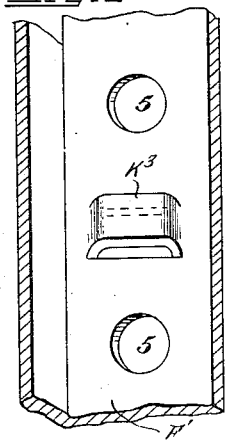
Fig. 8 is a fragmentary, perspective view of a door frame section provided with an alternate form of keeper.
Figure 9:
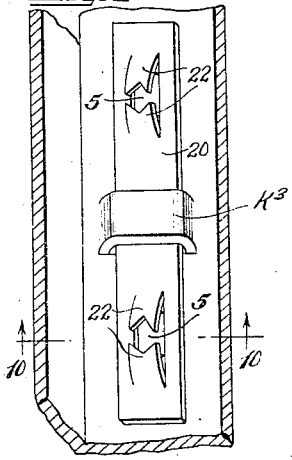
Fig. 9 shows a modification of the retaining element in assembled relation on a door frame section embodying the form of keeper illustrated in Fig. 8.
Figure 10:
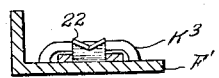
Fig. 10 is a section taken on line 10—10 of Fig. 9.

In Figs. 8 and 9 an alternate form of keeper means K3, is shown provided on the frame support F''. This form of keeper may be obtained by providing substantially parallel slits in the support such that the intermediate strip of metal may be deformed out of its plane to bridge the opening presented and thus provide a substantially integral pocket on the inner face of the support. With this type of keeper device, a retaining element in the form of a substantially flat elongated plate 20, Fig. 9, may be employed. The retaining plate is provided with integral bolt receiving means comprising spring tongues 22 deformed out of the plane thereof to function in fastening engagement in the manner set forth with respect to the retaining device represented in Figs. 2, 4 and 6. Since the spring tongues 22 are yieldable and project out of the plane of the substantially flat plate, they are admirably suited for preventing accidental dislodgment of the retaining device from its assembled position on the support in engagement with the keeper K3. Thus, in assembling the retaining device on the support, the yieldable tongues of one of the bolt receiving means are caused to be depressed sufficient to allow the adjacent end of the strip to pass through the opening provided by the keeper K3. When the tongues are clear of the keeper, they naturally flex to their normal raised position, in which relation they project into the path of the keeper K3, Fig. 10, to be effective as stops preventing loss or accidental removal of the retaining device from its applied position on the inner face of the support preparatory to application of the retaining bolts to mount a dovetail member on the outer face thereof substantially as described with respect to Figs. 1–7 inclusive.

Figure 11:
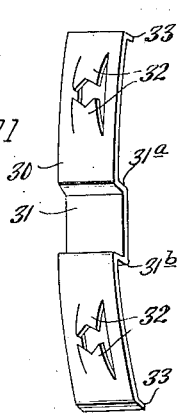
Fig. 11 illustrates in perspective a further form of retaining device.
Figure 12:
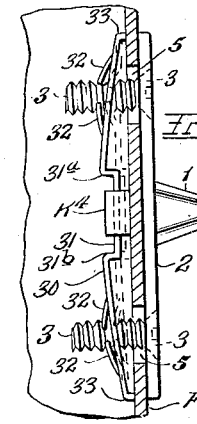
Fig. 12 is a side elevational view of the adjustable mounting provided for a door dovetail member embodying the retaining device of Fig. 11 and held in assembled relation on a support by keeper means such as shown in Fig. 3 or Fig. 8.

Figs. 11 and 12 disclose a further form of retaining element and which may be employed with keeper means such as shown in either Fig. 3 or 8. This form of retaining element comprises a bowed, plate-like member 30, provided with bolt engaging means 32, and suitably deformed to provide an offset portion 31, intermediate the ends thereof, said ends being in the form of substantial abutments 33, providing for increased resilient engagement of the retaining device in assembled relation with the keeper K4, on the support F2, and also reinforcing the same in the applied mounted position of the base plate 2 of the dovetail member by the bolts 3 as shown in Fig. 12. In application and use, the bowed retaining element is flattened sufficient to permit engagement thereof with the keeper K4, in the area of the offset portion 31. When seated in applied position on the support, the retaining device naturally tends to assume its initially bowed relation in frictional engagement with the keeper; and since the offset portion 31 presents spaced shoulders 31a, 31b, of greater spacing than the width of the keeper, K4, Fig. 12, the retaining device is effectively locked in applied position on the support yet is capable of limited longitudinal movement thereon such that bolt engaging means 32 have sufficient free movement for most efficiently engaging the bolts 3 in the necessary location thereof for properly mounting the dovetail member in desired position on the support. Thus when the bolts 3 are applied to complete the assembly, the entire mounting may be easily adjusted as a unit to desired position on the supporting wall whereupon the bolts are driven home to rigidly clamp the retaining device on the inner face of the support as indicated in dotted lines in Fig. 12. A most rigid clamping action may be obtained by virtue of the abutment end sections 33 cooperating with the base of the offset portion 31, which, in clamping position, serves as an abutment means whereby those portions of the retaining device carrying the bolt engaging means are reinforced such that most effective engagement and positive locking action of the spring tongues 32 with the retaining bolts is obtained; this locking action is effected when the bolts are tightened whereupon the abutment end sections 33 are caused to move outwardly from the axes of the bolts with the result that the spring tongues move inwardly, gripping the bolts with progressively increasing force.

In all embodiments of the invention, it will be readily appreciated that the improved construction provides a most simple, inexpensive mounting requiring a minimum of parts and few assembling operations and in which the cooperating lug and socket members of a door dovetail, for example, may be quickly positioned on a door and door jamb, respectively, as accurately as necessary at the time of installation for obtaining suitable alignment of the molding, stripe or belt line which extends around the body of the automobile and partly across the doors. Unlike prior structures of this type, after the first installation, a dovetail member is capable of adjustment as a unit in assembled relation on its support by a simple loosening and tightening of the bolt fastenings to clamp the same in adjusted position to take up for wear or to compensate for inaccuracies occurring incident to use and handling.

It will also be obvious that the teachings of the present invention may be embodied in practically any construction, especially metallic structures, in which it is desirable or necessary that a member have a simple mounting which is capable of quick and easy adjustment either at the time of installation or at any subsequent time thereafter without disassembling any of the respective parts. Such constructions, for example, may be the door latch and striker plate members of automobiles, refrigerators, etc., door handles, hinges, locks, or any other device held in mounted position by bolt fastenings.

While the invention has been described in detail with the specific examples such examples are illustrative only, since other modifications within the spirit and scope of the invention will be apparent to those skilled in the art. Hence the invention is to be understood as limited only as indicated in the appended claims in which the intent is to set forth all the novelty over the prior art.

What is claimed is:

1. An adjustable connection comprising, in combination, a supporting wall having an aperture, a member to be mounted thereon, a retaining element having integral bolt receiving means deformed therefrom, integral keeper means provided on said wall comprising a lug element struck and formed therefrom to project out of the plane thereof, said keeper means being adapted to hold the retaining element in adjustable assembled relation on the wall preparatory to the application of a bolt through the aperture in the wall to engage with the said integral bolt receiving means of the retaining element to mount the said member in adjustable position on the supporting wall.

2. An adjustable connection comprising, in combination, a supporting wall having an aperture, a member to be mounted thereon, a retaining element having integral bolt receiving means deformed therefrom, integral keeper means provided on said wall comprising a lug element struck and formed therefrom to project out of the plane thereof, said keeper means being adapted to hold the retaining element in adjustable assembled relation on the wall preparatory to the application of a bolt passing through the aperture in the wall to engage with the said integral bolt receiving means of the retaining element to mount the said member in position on the supporting wall, said aperture in the wall being of greater size than the cross-section of the bolt whereby the mounting is adjustable as a unit on the said wall.

3. An adjustable connection comprising, in combination, an apertured wall support, a member mounted thereon by a bolt fastening, a one-piece retaining element of a thickness relatively thin with respect to the cross section of the bolt and having bolt receiving means deformed therefrom to engage the bolt, keeper means provided on said wall comprising a lug element struck and formed therefrom to project out of the plane thereof, said keeper means being adapted to cooperate with means on the retaining element to hold the same in adjustable assembled relation on the wall preparatory to connecting said member with the retaining element by said bolt fastening, said bolt fastening passing through an aperture in the wall of greater size than its cross-section to be freely movable therein whereby the complete mounting is adjustable as a unit in its assembled relation on the wall support.

4. An adjustable connection comprising, in combination, an apertured supporting wall, a member mounted thereon by spaced bolt fastenings, a retaining element having complementary spaced bolt receiving means deformed therefrom adapted to engage the bolt fastenings, integral keeper means provided on said wall comprising a lug element struck and formed therefrom to project out of the plane thereof, said keeper means being adapted to hold the retaining element in adjustable assembled relation on the wall preparatory to connecting said member with the retaining element by said bolt fastenings to mount the said member on the wall, said bolt fastenings passing through apertures in the wall of greater size than their cross-sections to be freely movable therein whereby the complete mounting is adjustable as a unit in its assembled relation on the supporting wall.

5. An adjustable connection comprising, in combination, an apertured supporting wall, a member mounted thereon by spaced bolt fastenings, a retaining element having complementarily spaced bolt receiving means deformed therefrom adapted to engage the bolt fastenings, integral keeper means provided on said wall comprising a lug element struck and formed therefrom to project out of the plane thereof, said keeper means being adapted to cooperate with means on the retaining element to hold the same in adjustable assembled relation on the wall preparatory to connecting said member with the retaining element by said bolt fastenings to mount the said member on the wall, said bolt fastenings passing through apertures in the wall of greater size than their cross-sections to be freely movable therein whereby the complete mounting is adjustable as a unit in its assembled relation on the supporting wall.

6. An adjustable connection comprising, in combination, an apertured supporting wall, a member mounted thereon by spaced bolt fastenings, a one-piece retaining element of a thickness relatively thin with respect to the cross-section of the bolts and having complementarily spaced bolt receiving means deformed therefrom to engage the bolts, keeper means provided on said wall comprising a lug element struck and formed therefrom to project out of the plane thereof, said keeper means being adapted to cooperate with the retaining element to hold the same in adjustable assembled relation on the inner face of the wall preparatory to mounting said member on the outer face thereof by bolt fastenings engaging with the bolt receiving means provided in the retaining element, said bolt fastenings passing through apertures in the wall of greater size than their cross-sections to be freely movable therein whereby the complete mounting is adjustable as a unit in its assembled relation on the supporting wall.

7. An adjustable connection comprising, in combination, a supporting wall having an aperture, a member mounted thereon, a retaining element having a hump and integral bolt receiving means deformed therefrom, keeper means provided on said wall, said keeper means being adapted to engage the hump on the retaining element to frictionally hold the same in adjustable assembled relation ot nhe wall preparatory to the application of a bolt fastening passing through said aperture in the wall and engaging with the said integral bolt receiving means of the retaining element to mount the member in desired position on the supporting wall.

8. An adjustable connection comprising, in combination, an apertured supporting wall, a member mounted thereon by spaced bolt fastenings, a one-piece retaining element of the thickness relatively thin with respect to the cross-section of the bolts and having a hump and complementarily spaced bolt receiving means deformed therefrom to engage the bolts, keeper means provided on said wall, said keeper means being adapted to engage the hump on the retaining element to frictionally hold the same in adjustable assembled relation on the wall preparatory to mounting said member thereon by the bolt fastenings engaging with the said bolt receiving means provided in the retaining element, said bolt fastenings passing through apertures in the wall of greater size than their cross-sections to be freely movable therein in order that the complete mounting be capable of adjustment as a unit in its assembled relation on the supporting wall.

9. An adjustable connection comprising, in combination, an apertured supporting wall, a member mounted thereon by spaced bolt fastenings, a one-piece retaining element of a thickness relatively thin with respect to the cross-section of the bolts and having complementarily spaced bolt receiving means deformed therefrom to project out of the plane theerof, keeper means provided on said wall comprising a lug element struck and formed therefrom to project out of the plane thereof, said keeper means being adapted to cooperate with said retaining element intermediate the spaced projecting bolt receiving means to hold the same in adjustable assembled relation on the wall preparatory to mounting said member thereon by bolt fastenings engaging with the bolt receiving means, said bolt fastenings passing through apertures in the wall of greater size than their cross-sections to be freely movable therein in order that the mounting be capable of adjustment as a unit in its assembled relation on the supporting wall.

10. An adjustable connection comprising, in combination, an apertured supporting wall, a member mounted thereon, a substantially bowed retaining element having an offset shouldered portion and integral bolt receiving means deformed therefrom, keeper means provided on said wall, said keeper means being adapted to cooperate with the retaining element intermediate the spaced shoulders provided by said offset portion thereof to hold the same in adjustable assembled relation on the wall preparatory to the application of a bolt fastening through an aperture in the wall to engage with the said integral bolt receiving means to mount the member in desired position on the supporting wall.

11. An adjustable connection comprising, in combination, an apertured supporting wall, a member mounted thereon by spaced bolt fastenigs, a one-piece retaining element of a thickness relatively thin with respect to the cross-section of the bolts and having an offset shouldered portion and complementary spaced bolt receiving means deformed therefrom, keeper means provided on said wall, said keeper means being adapted to cooperate with the retaining element intermediate the spaced shoulders provided by said offset portion thereof to hold the same in adjustable assembled relation on the wall preparatory to mounting said member thereon by bolt fastenings engaging with the bolt receiving means, said bolt fastenings passing through apertures in the wall of greater size than their cross-sections to be freely movable therein in order that the mounting be capable of adjustment as a unit in its assembled relation on the supporting wall.

GEORGE A. TINNERMAN.